(12) United States Patent
Buryak et al.

(10) Patent No.: US 8,759,448 B2
(45) Date of Patent: *Jun. 24, 2014

(54) POLYETHYLENE MOULDING COMPOSITION WITH IMPROVED STRESS CRACK/STIFFNESS RELATIONSHIP AND IMPACT RESISTANCE

(75) Inventors: Andrey Buryak, Linz (AT); Albrecht Dix, Linz (AT); Balakantha Rao Kona, Linz (AT)

(73) Assignee: Borealis AG, Vienna (AT)

( * ) Notice: Subject to any disclaimer, the term of this patent is extended or adjusted under 35 U.S.C. 154(b) by 0 days.

This patent is subject to a terminal disclaimer.

(21) Appl. No.: 13/575,329

(22) PCT Filed: Jan. 27, 2011

(86) PCT No.: PCT/EP2011/051172
§ 371 (c)(1),
(2), (4) Date: Oct. 4, 2012

(87) PCT Pub. No.: WO2011/092263
PCT Pub. Date: Aug. 4, 2011

(65) Prior Publication Data
US 2013/0018154 A1  Jan. 17, 2013

(30) Foreign Application Priority Data

Jan. 29, 2010 (EP) .................................... 10250152

(51) Int. Cl.
*C08F 8/00* (2006.01)
*C08L 23/04* (2006.01)

(52) U.S. Cl.
USPC .......................................... 525/191; 525/240

(58) Field of Classification Search
USPC .................................. 525/191, 240
See application file for complete search history.

(56) References Cited

U.S. PATENT DOCUMENTS

| | | | |
|---|---|---|---|
| 3,887,534 A | 6/1975 | Baba et al. |
| 4,234,624 A | 11/1980 | Linde Roth et al. |
| 4,493,923 A | 1/1985 | McCullough, Jr. et al. |
| 4,508,872 A | 4/1985 | McCullough, Jr. et al. |
| 4,599,391 A | 7/1986 | Yamamoto et al. |
| 4,639,386 A | 1/1987 | Akao |
| 4,677,007 A | 6/1987 | Murray et al. |
| 4,696,979 A | 9/1987 | Shiga et al. |
| 4,871,819 A | 10/1989 | Oonishi et al. |
| 4,994,539 A | 2/1991 | Orikasa et al. |
| 5,286,540 A | 2/1994 | Suga et al. |
| 5,317,035 A | 5/1994 | Jacoby et al. |
| 5,457,016 A | 10/1995 | Dethlefs |
| 5,486,558 A | 1/1996 | Lee |
| 5,752,362 A | 5/1998 | Eichbauer et al. |
| 5,773,123 A | 6/1998 | Anwyll, Jr. |
| 6,265,055 B1 | 7/2001 | Simpson et al. |
| 6,291,590 B1 | 9/2001 | Sainio et al. |
| 6,440,509 B1 | 8/2002 | Littlejohn et al. |
| 6,503,637 B1 | 1/2003 | Van Loon |
| 6,559,232 B2 | 5/2003 | Inoue et al. |
| 6,573,334 B1 | 6/2003 | Pitteri et al. |
| 6,583,241 B1 | 6/2003 | Beach et al. |
| 6,733,717 B1 | 5/2004 | Marczinke et al. |
| 6,770,714 B2 | 8/2004 | Ommundsen et al. |
| 2002/0132950 A1 | 9/2002 | Smith et al. |
| 2005/0161866 A1 | 7/2005 | Batlaw et al. |
| 2005/0200046 A1 | 9/2005 | Breese |
| 2005/0234217 A1 | 10/2005 | Bigiavi et al. |
| 2006/0142495 A1 | 6/2006 | Lalho et al. |
| 2007/0191531 A1 | 8/2007 | Gaschlet et al. |
| 2008/0276717 A1 | 11/2008 | Teh et al. |

(Continued)

FOREIGN PATENT DOCUMENTS

EP  0111602  6/1984
EP  0146270  6/1985

(Continued)

OTHER PUBLICATIONS

Adebi J App Polym Sci vol. 101, 1456-1462, 2006.
English Abstract for Chinese application No. 1676545 published Oct. 5, 2005.
International Search Report dated Apr. 2, 2010 for international application No. PCT/EP2009/063251.
International Search Report dated Jan. 29, 2009 for international application No. PCT/US2008/010359.
International Search Report dated Nov. 12, 2009 for international application No. PCT/EP2009/004929.
International Search Report dated Nov. 12, 2009 for international application No. PCT/EP2009/004931.

(Continued)

*Primary Examiner* — Nathan M Nutter
(74) *Attorney, Agent, or Firm* — Gardner, Groff, Greenwald & Villanueva, P.C.

(57) ABSTRACT

A high density polyethylene moulding composition having a multimodal molecular weight distribution, having a density according to ISO 1183 at 23° C. in the range of 945 to 965 kg/m³ and an $MFR_{190/2}$ according to ISO 1133 in the range of 0.05 to 25 g/10 min, said polyethylene moulding composition comprising at least three ethylene polymer fractions having distinct molecular weights: A) 15 to 50 wt % of a low molecular weight ethylene homopolymer fraction with a weight average molecular weight Mw in the range of 15 to 40 kg/mol; B) 15 to 50 wt % of a medium molecular weight ethylene homopolymer fraction with a weight average molecular weight Mw in the range of 70 to 180 kg/mol; and C) 15 to 50 wt % of a high molecular weight ethyleve copolymer fraction with a weight average molecular weight Mw in the range of 200 to 400 kg/mol; and wherein the composition has: a tensile modulus according to ISO 527-2: 1993 measured on compression moulded samples of at least 800 MPa; a Charpy impact strength CIS (23° C.) according to ISO 179:2000 measured on V- notched samples produced by compression moulding of at least 30 kJ/m²; and an environmental stress crack resistance ESCR measured as FNCT full notch creep test according to ISO/DIS 16770.3 at 50° C. and 6 MPa of at least 20 h.

12 Claims, 1 Drawing Sheet

(56) References Cited

U.S. PATENT DOCUMENTS

| | | | |
|---|---|---|---|
| 2010/0003435 A1 | 1/2010 | Jaaskelainen et al. | |
| 2010/0009156 A1 | 1/2010 | Daviknes et al. | |
| 2010/0105839 A1* | 4/2010 | Mehta | 525/195 |
| 2010/0304062 A1 | 12/2010 | Daviknes et al. | |
| 2011/0028665 A1 | 2/2011 | Eriksson et al. | |
| 2011/0132864 A1 | 6/2011 | Jamtvedt et al. | |
| 2011/0162869 A1 | 7/2011 | Smedberg | |
| 2011/0168427 A1 | 7/2011 | Smedberg et al. | |
| 2011/0180304 A1 | 7/2011 | Smedberg et al. | |
| 2011/0290529 A1 | 12/2011 | Pakkenen | |
| 2013/0030125 A1* | 1/2013 | Buryak et al. | 525/240 |

FOREIGN PATENT DOCUMENTS

| | | |
|---|---|---|
| EP | 0151883 | 8/1985 |
| EP | 0184362 | 6/1986 |
| EP | 0251340 | 1/1988 |
| EP | 0260791 | 3/1988 |
| EP | 0309138 | 3/1989 |
| EP | 0463402 | 1/1992 |
| EP | 0517868 | 7/1992 |
| EP | 0688794 | 12/1995 |
| EP | 0735090 | 10/1996 |
| EP | 0903356 | 3/1999 |
| EP | 0928797 | 7/1999 |
| EP | 0949274 | 10/1999 |
| EP | 1170329 | 9/2002 |
| EP | 1333044 | 8/2003 |
| EP | 1375528 | 1/2004 |
| EP | 1488924 | 12/2004 |
| EP | 1655334 | 5/2006 |
| EP | 1674238 | 6/2006 |
| EP | 1712574 | 10/2006 |
| JP | 7238204 | 9/1995 |
| JP | 10036581 | 10/1998 |
| JP | 2000178404 | 6/2000 |
| JP | 2003138074 | 5/2003 |
| JP | 2004182955 | 7/2004 |
| WO | 9308222 | 4/1993 |
| WO | 9413707 | 6/1994 |
| WO | 9523829 | 9/1995 |
| WO | 9706951 | 2/1997 |
| WO | 9750093 | 12/1997 |
| WO | 9924478 | 5/1999 |
| WO | 9924479 | 5/1999 |
| WO | 9964509 | 12/1999 |
| WO | 9965039 | 12/1999 |
| WO | 0032695 | 6/2000 |
| WO | 0071615 | 11/2000 |
| WO | 0202323 | 1/2002 |
| WO | 0231046 | 4/2002 |
| WO | 0236672 | 5/2002 |
| WO | 02038383 | 8/2002 |
| WO | 02086916 | 10/2002 |
| WO | 03000740 | 1/2003 |
| WO | 03064519 | 8/2003 |
| WO | 04000902 | 12/2003 |
| WO | 2004067654 | 8/2004 |
| WO | 2005009714 | 2/2005 |
| WO | 2005074428 | 8/2005 |
| WO | 2005103132 | 8/2005 |
| WO | 2006037603 | 4/2006 |
| WO | 2006053740 | 5/2006 |
| WO | 2006065799 | 6/2006 |
| WO | 2006131266 | 12/2006 |
| WO | 2007022908 | 3/2007 |
| WO | 2007042217 | 4/2007 |
| WO | 2007071445 | 6/2007 |
| WO | 2007071447 | 6/2007 |
| WO | 2008009393 | 1/2008 |
| WO | 2008074493 | 6/2008 |
| WO | 2010003649 | 1/2010 |
| WO | 2010003651 | 1/2010 |
| WO | 2010047743 | 4/2010 |
| WO | 2011038886 | 4/2011 |
| WO | 2011092264 | 8/2011 |

OTHER PUBLICATIONS

International Search Report dated Oct. 15, 2009 for international application No. PCT/US2009/004930.
Moore et al., Polypropylene Handbook, Hanser Publishers, 1996.
Office Action dated Feb. 23, 2011 for Chinese application No. 200780040208.4.
Office Action dated May 30, 2011 for Chinese application No. 200880102737.7.
Written Opinion dated Mar. 11, 2008 for international application No. PCT/EP2007/009918.
International Search Report dated Mar. 17, 2011 for international application No. PCT/EP2011/051172.
Written Opinion dated Mar. 17, 2011 for international application No. PCT/EP2011/051172.
International Search Report dated Mar. 17, 2011 for international application No. PCT/EP2011/051173.
Written Opinion dated Mar. 17, 2011 for international application No. PCT/EP2011/051173.

* cited by examiner

POLYETHYLENE MOULDING COMPOSITION WITH IMPROVED STRESS CRACK/STIFFNESS RELATIONSHIP AND IMPACT RESISTANCE

IN THE CROSS-REFERENCE TO RELATED APPLICATIONS

This application is a U.S. national phase application under 35 USC 371 of international application number PCT/EP2011/051172, filed Jan. 27, 2011, which claims priority to European Application No. 10250152.5, filed Jan. 29, 2010, which is hereby incorporated herein by reference in its entirety for all purposes.

The present invention relates to a high density polyethylene moulding composition having a trimodal molecular weight distribution, i.e. a composition comprising at least three ethylene polymer fractions having distinct molecular weights and is particularly suitable for producing for shaped articles, especially injection, blow and compression moulded articles, in particular for caps and closures, transport packaging, houseware and thin wall packaging applications.

Injection moulding may be used to make a wide variety of articles including articles having relatively complex shapes and a range of sizes. Injection moulding is, for instance, suited for the manufacture of caps and closures, and articles used in transportation packaging which often have a particular form suited to the objects which they carry. Examples of such articles include boxes, bins, pallets, pails, trays and crates. Furthermore, injection moulding is widely used to produce articles for houseware applications, such as sink bowls and drainers, mixing bowls, food containers and buckets, as well as to produce thin wall packaging articles such as open top plastic containers for frozen or fresh food or non-food applications like paint, adhesives, cosmetics and pharmaceuticals.

As raw materials become more expensive and consumers and manufacturers more demanding, polymer retailers are looking to provide lower cost, high performance articles to their customers. Important properties of the polymer to be injection moulded are its mechanical properties which, in turn, determine the properties of the final moulded article. In particular, the polymer must have good impact resistance, and, simultaneously, a good balance between environmental stress crack resistance ESCR (which, for example, is measured in terms of the bell test or FNCT) and stiffness (which, for example, is measured in terms of the E-modulus). Of course, the polyethylene composition at the same time must have good processability, such as good flowability. To down gauge and produce lighter articles there is an increasing need for stiffer polymeric materials. Higher stiffness allows articles to be manufactured with thinner walls and hence allows less raw material to be used per article than for less stiff articles. Thinner walls mean lighter articles and hence lower transport costs. Lighter articles also mean a reduction in cycle time which is also of great importance. Lighter articles will cool more rapidly allowing the moulding process to be run more frequently and more articles can be produced in a given period of time.

Unfortunately it is known in the state of the art that other important properties, such as impact resistance and ESCR, decrease as stiffness of the polymer increases. These properties are contradictory, at least in part, because, for example, ESCR improves with decreasing density whereas stiffness improves with increasing density.

In general, stiffness and ESCR can be improved by the skilled person in known ways, e.g. by increasing the molecular weight of the polymer. Higher molecular weight polymers are known to possess improved mechanical properties over polymers of lower molecular weight. However, increasing the molecular weight of the polyethylene usually decreases the processability and, in particular, flowability of the polymer. Polymers with poor flow are not readily extruded or moulded and are thus of limited value.

There is also a relation between stiffness and impact strength. Stiffer materials tend to have poorer impact strength as they show more brittle behaviour. High impact strength materials tend to be soft to be able to absorb impacts. For moulded articles, the ability to withstand impact is an important property. However, the manufacture of articles with high stiffness and good impact properties is a problem known in the state of the art.

Thus, to create superior articles from polyethylene moulding compositions, it is important that the used composition has good or even excellent impact resistance and simultaneously a good or even excellent balance of mechanical properties, in particular in ESCR and stiffness as measured in terms of the E-modulus. At the same time the polyethylene moulding compositions should exhibit good processability, such as good flowability.

Although much development work has been done in the field of polyethylene moulding compositions, there remains a need for a polyethylene composition suitable for use in injection, blow and compression moulding, in particular for caps and closures, transport packaging and houseware applications, which provides a combination of, on the one hand, excellent mechanical properties including excellent impact strength, stress crack resistance and stiffness as well as a good balance between these mechanical properties, and, on the other hand, good processability, including good flowability. It is emphasized that although these properties at least in part are contrary to each other, as described above, to provide a polyethylene composition for moulding applications, each of them must be achieved.

In EP-A-1772486, a trimodal polymer composition is disclosed which contains a small proportion of an ultra high molecular weight component in order to provide good stiffness and impact properties. We have found however that the use of such an ultrahigh molecular weight component can introduce inhomogeneity into the blend. Tensile modulus and charpy impact strength can actually be maximised, without any loss of homogeneity in the blend, by employing a higher percentage of the high molecular weight component but using a lower molecular weight. There is no need therefore to employ an ultrahigh molecular weight component (having for example a Mw of 500 kg/mol or more). Better results can be obtained using lower more accessible Mw values.

Surprisingly, these goals can be achieved by a polyethylene moulding composition comprising a low molecular weight homopolymer fraction, a medium molecular weight homopolymer fraction and a high molecular weight copolymer fraction.

SUMMARY OF INVENTION

The present invention thus provides a high density polyethylene moulding composition having a multimodal molecular weight distribution, having a density according to ISO 1183 at 23° C. in the range of 945 to 965 kg/m³ and an MFR$_{190/2}$ according to ISO 1133 in the range of 0.05 to 25 g/10 min, said polyethylene moulding composition comprising at least three ethylene polymer fractions having distinct molecular weights:

A) 15 to 50 wt % of a low molecular weight ethylene homopolymer fraction with a weight average molecular weight Mw in the range of 15 to 40 kg/mol;

B) 15 to 50 wt % of a medium molecular weight ethylene homopolymer fraction with a weight average molecular weight Mw in the range of 70 to 180 kg/mol; and C) 15 to 50 wt % of a high molecular weight ethylene copolymer fraction with a weight average molecular weight Mw in the range of 200 to 400 kg/mol;

and wherein the composition has:

a tensile modulus according to ISO 527-2: 1993 measured on compression moulded samples of at least 800 MPa;

a Charpy impact strength CIS (23° C.) according to ISO 179:2000 measured on V-notched samples produced by compression moulding of at least 30 kJ/m$^2$; and an environmental stress crack resistance ESCR measured as FNCT full notch creep test according to ISO/DIS 16770.3 at 50° C. and 6 MPa of at least 20 h.

Viewed from another aspect the invention provides a moulded article comprising a composition as hereinbefore defined.

Viewed from another aspect the invention provides use of the composition as hereinbefore defined in the manufacture of a molded article, in particular a compression moulded or injection moulded article.

Viewed from another aspect the invention provides: a high density polyethylene moulding composition having a multimodal molecular weight distribution, having a density according to ISO 1183 at 23° C. in the range of 945 to 965 kg/m$^3$ and an MFR$_{190/2}$ according to ISO 1133 in the range of 0.05 to 25 g/10 min, said polyethylene moulding composition comprising at least three ethylene polymer fractions having distinct molecular weights:

A) 15 to 50 wt % of a lower molecular weight ethylene homopolymer fraction with an MFR$_{190/2}$ of 50 to 1000 g/10 min;

B) 15 to 50 wt % of a medium molecular weight ethylene homopolymer fraction with an MFR$_{190/21}$ of 6 to 50 g/10 min; and C) 15 to 50 wt % of a higher molecular weight ethylene copolymer fraction with an MFR$_{190/21}$ of 0.05 to 5 g/10 min;

and wherein the composition has:

a tensile modulus according to ISO 527-2: 1993 measured on compression moulded samples of at least 800 MPa;

a Charpy impact strength CIS (23° C.) according to ISO 179:2000 measured on V-notched samples produced by compression moulding of at least 30 kJ/m$^2$; and an environmental stress crack resistance ESCR measured as FNCT full notch creep test according to ISO/DIS 16770.3 at 50° C. and 6 MPa of at least 20 h.

The invention further provides moulded articles made therefrom.

Viewed from another aspect the invention provides a process for the manufacture of a composition as hereinbefore defined comprising blending A) 15 to 50 wt % of a low molecular weight ethylene homopolymer fraction with a weight average molecular weight Mw in the range of 15 to 40 kg/mol;

B) 15 to 50 wt % of a medium molecular weight ethylene homopolymer fraction with a weight average molecular weight Mw in the range of 70 to 180 kg/mol; and C) 15 to 50 wt % of a high molecular weight ethylene copolymer fraction with a weight average molecular weight Mw in the range of 200 to 400 kg/mol so as to form a high density polyethylene moulding composition having a multimodal molecular weight distribution, a density according to ISO 1183 at 23° C. in the range of 945 to 965 kg/m$^3$ and an MFR$_{190/2}$ according to ISO 1133 in the range of 0.05 to 25 g/10 min, a tensile modulus according to ISO 527-2: 1993 measured on compression moulded samples of at least 800 MPa;

a Charpy impact strength CIS (23° C.) according to ISO 179:2000 measured on V-notched samples produced by compression moulding of at least 30 kJ/m$^2$; and an environmental stress crack resistance ESCR measured as FNCT full notch creep test according to ISO/DIS 16770.3 at 50° C. and 6 MPa of at least 20 h.

DETAILED DESCRIPTION OF INVENTION

It should be noted that the multimodal polymer composition of the present invention is characterized, not by any single one of the above defined features, but by the combination of all the features defined above. By this unique combination of features it is possible to obtain a polyethylene moulding composition of superior performance, particularly with regard to the stiffness/ESCR balance and impact properties.

Where the term "molecular weight" is used herein, the weight average molecular weight is meant.

Composition Properties

Usually, a polyethylene composition comprising at least two polyethylene fractions, which have been produced under different polymerization conditions resulting in different (weight average) molecular weights and molecular weight distributions for the fractions, is referred to as "multimodal". Accordingly, in this sense the compositions of the invention are multimodal polyethylenes. The prefix "multi" relates to the number of different polymer fractions the composition is consisting of. Thus, for example, a composition consisting of three fractions is called "trimodal".

As used herein the terms "multi-modal" and "trimodal" are intended to cover polymers having at least three (or three exactly for trimodal) different components in the polymer. Ideally, the composition will show three centred maxima along the x-axis of the molecular weight distribution curve as determined by gel permeation chromatography. Alternatively, the composition will show one maximum with two distinct shoulders along the x-axis of the molecular weight distribution curve as determined by gel permeation chromatography. In such a curve d(log(Mw)) is plotted as ordinate against log (Mw), where Mw is molecular weight.

The polyethylene moulding composition of the invention preferably comprises a trimodal polymer which comprises a low molecular weight ethylene homopolymer fraction A (LMW$_h$-fraction), a medium molecular weight ethylene homopolymer fraction (MMW$_h$-fraction) and a high molecular weight ethylene copolymer fraction (HMW$_c$-fraction) as defined in detail below. The polyethylene moulding composition of the invention has been found to allow the formation of articles having an ideal balance of properties. They have excellent mechanical properties and are readily processed. In particular, articles made therefrom exhibit an excellent stiffness/ESCR balance and excellent impact strength.

As noted above, the multimodal composition has a density according to ISO 1183 at 23° C. in the range of preferably 945 to 965 kg/m$^3$, more preferably 950 to 960 kg/m$^3$. The polyethylene composition claimed is thus a high density polyethylene material.

The MFR$_{190/2}$ according to ISO 1133 of the multimodal composition is in the range of 0.05 to 25 g/10 min, preferably 0.1 to 10 g/10 min. Preferably the polyethylene composition has an MFR$_{190/2}$ of at least 0.1 g/10 min, more preferably at least 0.3 g/10 min and most preferably of at least 0.5 g/10 min.

Furthermore the polyethylene composition has an $MFR_{190/2}$ of 25 g/10 min or less, preferably of 15 g/10 min or less and most preferably of 5.0 g/10 min or less. The most preferred range is therefore 0.5 to 5.0 g/10 min.

The tensile modulus (E-modulus) of the composition measured on compression moulded samples of the multimodal polyethylene moulding composition is at least 800 MPa, preferably at least 850 MPa, more preferably at least 900 MPa and most preferably at least 950 MPa or more. Compression moulded samples are made as described in the examples.

Furthermore the composition of the invention has a Charpy impact strength (23° C.) measured on V-notched samples produced by compression moulding of at least 30 kJ/m², preferably of at least 35 kJ/m². The composition of the invention preferably has a Charpy impact strength (−20° C.) measured on V-notched samples produced by compression moulding of at least 10 kJ/m², preferably of at least 14 kJ/m².

In addition, the composition of the invention has an environmental stress crack resistance ESCR measured as FNCT full notch creep test according to ISO/DIS 16770.3 at 50° C. and 6 MPa of at least 20 h, preferably at least 25 h. This too is measured on compression moulded samples as described in detail in the examples section.

It is a further feature of the polyethylene moulding composition of the invention that it possesses also good flowability. This is shown in the examples with reference to a Spiral test in which the polymer composition is injected into a spiral mould under certain pressure and the distance (in cm) covered by the polymer composition measured as indication of its flow properties.

Preferably the polyethylene moulding composition of the invention possesses a Spiral test parameter (600 bar) which is at least 15 cm, preferably at least 20 cm. Preferably the polyethylene moulding composition of the invention possesses a Spiral test parameter (1000 bar) which is at least 25 cm, preferably at least 30 cm. Preferably the polyethylene moulding composition of the invention possesses a Spiral test parameter (1400 bar) which is at least 35 cm, preferably at least 40 cm.

As already stated above, the polyethylene moulding composition of the invention comprises at least three different ethylene polymer fractions having distinct molecular weights. It is preferred if fractions A, B and C make up the only polymeric components in the polymer composition of the invention. Thus, the composition consists essentially of fractions A, B and C. It will be appreciated that any composition may contain standard polymer additives as well. For the avoidance of doubt, if any such additives are present, the properties of the composition are measured on the composition with additives.

The combination of fractions A, B and C alone will be called the "base resin" herein.

Fraction A

Fraction A is a low molecular weight ethylene homopolymer fraction ($LMW_h$-fraction). The molecular weight of fraction A is in the range of 15 to 40 kg/mol, preferably 20 to 30 kg/mol.

The $MFR_{190/2}$ according to ISO 1133 of fraction A is preferably at least at least 50 g/10 min, more preferably at least 100 g/10 min. The upper limit for the $MFR_2$ of the LMW fraction is preferably 1000 g/10 min.

The density according to ISO 1183 at 23° C. of the $LMW_h$-fraction is preferably at least 960 kg/m³, preferably in the range of 965 to 980 kg/m³, preferably 970 to 975 kg/m³.

The term ethylene homopolymer as used herein is intended to encompass polymers which consist essentially of repeated units deriving from ethylene. Homopolymers may, for example, comprise at least 99.8 wt %, preferably at least 99.9 wt %, of repeat units deriving from ethylene. In a preferred embodiment only ethylene units are detectable in Fraction A.

Fraction B

Fraction B is a medium molecular weight ethylene homopolymer fraction ($MMW_h$-fraction). The $MMW_h$-fraction has a molecular weight higher than the $LMW_h$-fraction and a lower $MFR_{190/2}$ than the $LMW_h$-fraction.

Thus, the $HMW_h$-fraction has a molecular weight in the range of 70 to 180 kg/mol, preferably in the range 100 to 180 kg/mol, preferably 110 to 160 kg/mol, more preferably 120 to 140 kg/mol. Preferably, the $MFR_{190/2}$ of the $MMW_h$ fraction is less than 10 g/10 min, preferably of less than 5 g/10 min and more preferably less than 1 g/10 min. The $MMW_h$-fraction furthermore preferably has an $MFR_{190/21}$ in the range of 5 to 50 g/10 min, preferably 10 to 20 g/10 min.

The density according to ISO 1183 at 23° C. of the $MMW_h$-fraction is in the range of 940 to 965 kg/m³, preferably 945 to 960 kg/m³. It is preferred if the density of the $MMW_h$ fraction is less than that of the $LMW_h$ fraction. Preferably there will be at least 5 kg/m³ units between these components.

The term ethylene homopolymer as used herein is intended to encompass polymers which consist essentially of repeated units deriving from ethylene. Homopolymers may, for example, comprise at least 99.8 wt %, preferably at least 99.9 wt %, of repeat units deriving from ethylene. In a preferred embodiment only ethylene units are detectable in Fraction B.

Fraction C

Fraction C is a high molecular weight ethylene copolymer fraction ($HMW_c$-fraction). The $HMW_c$-fraction has a molecular weight higher than the $LMW_h$-fraction and the $MMW_h$-fraction and a lower $MFR_{190/21}$ than the $MMW_h$-fraction.

Thus, the $HMW_c$-fraction has a molecular weight in the range of 200 to 400 kg/mol, preferably 240 to 400 kg/mol, preferably 250 to 350 kg/mol, more preferably 265 to 320 kg/mol. In one embodiment, the Mw of the $HMW_c$-fraction should be less than 300 kg/mol. It has been found that by using a high Mw component with a Mw in the ranges quoted above, e.g. of less than 300 kg/mol, maximises performance. In particular, tensile modulus and charpy impact strength are maximised without any loss of homogeneity in the blend. Whilst higher Mw polymers exist, it is believed that by using a fraction C which has ultrahigh Mw actually starts to introduce inhomogeneity into the blend and therefore detracts from mechanical performance.

The density according to ISO 1183 at 23° C. of the $HMW_c$-fraction is preferably less than 925 kg/m³, preferably less than 915 kg/m³.

The $HMW_c$-fraction furthermore preferably has an $MFR_{190/21}$ in the range of 0.05 to 5 g/10 min.

The term ethylene copolymer as used herein is intended to encompass polymers comprising repeat units deriving from ethylene and at least one $C_{3-10}$ copolymer. Preferred copolymers are binary and therefore comprise ethylene and a single comonomer. The comonomers which can be employed include $C_{3-10}$ alpha olefins, preferably selected from but-1-ene, hex-1-ene, 4-methyl-pent-1-ene, kept-1-ene, oct-1-ene, and dec-1-ene, more preferably but-1-ene and hex-1-ene. Preferably hexene or butene, or a mixture of hexene and butene is used. In one embodiment of the invention only one comonomer is used. The comonomer is e.g. hexene or butene, preferably hexene.

Preferably, the ethylene copolymers contain 1 to 15 wt %, based on the weight of the high molecular weight ethylene fraction, of comonomer, preferably 2 to 12 wt % and more preferably 5 to 10 wt %.

The polyethylene moulding composition of the invention comprises fractions A, B and C in an amount of 15 to 50 wt %, such as 18 to 50 wt %, preferably 20 to 50 wt % for each fraction, preferably 20 to 40 wt %. In a preferred embodiment there is more than 20 wt %, e.g. at least 22 wt %, such as at least 25 wt % of the higher molecular weight fraction C. Having significant amounts of each fraction (i.e. 20 wt % or more), as opposed to small amounts of one fraction (such as less than 15 wt %) maximises performance.

Preferably fractions A, B and C are present in equal amounts, i.e. about 33 wt % for each fraction. It will be appreciated that a certain percentage of the composition may be formed from additives, which will normally be less than 5 wt %, preferably less than 1.0 wt %. The percentage ranges quoted refer to the amounts of each fraction in the overall composition.

Where features of fractions (A), (B) and (C) of the composition of the present invention are given, these values are generally valid for the cases in which they can be directly measured on the respective fraction, e.g. when the fraction is separately produced or produced in the first stage of a multi-stage process. However, the base resin may also be, and preferably is, produced in a multistage process wherein, for example, fractions (A), (B) and (C) are produced in subsequent stages. In such a case, the properties of the fractions produced in the second and third step (or further steps) of the multistage process can either be inferred from polymers, which are separately produced in a single stage by applying identical polymerisation conditions (e.g. identical temperature, partial pressures of the reactants/diluents, suspension medium, reaction time) with regard to the stage of the multi-stage process in which the fraction is produced, and by using a catalyst on which no previously produced polymer is present. Alternatively, the properties of the fractions produced in a higher stage of the multistage process may also be calculated, e.g. in accordance with B. Hagstrom, Conference on Polymer Processing (The Polymer Processing Society), Extended Abstracts and Final Programme, Gothenburg, Aug. 19 to 21, 1997, 4:13.

Thus, although not directly measurable on the multistage process products, the properties of the fractions produced in higher stages of such a multistage process can be determined by applying either or both of the above methods. The skilled person will be able to select the appropriate method.

Manufacture

The manner in which the polyethylene moulding composition of the invention is produced is not critical to the present invention. The composition can be produced by mechanical blending of the individual fractions, by reactor or in-situ blending, by combinations of these two processes or other means which achieve proper homogenization.

For example, the composition can be prepared by mechanical blending of the three fractions in the desired amount, e.g. using a conventional compounding or blending apparatus, like a Banbury mixer, a 2-roll rubber mill, Buss-co-kneader or a twin screw extruder Fractions A, B and C used for mechanical blending are prepared separately with any conventional ethylene homo-respectively co-polymerization method, e.g. in gas phase, slurry phase, liquid (bulk) phase using conventional reactors, such as loop reactor, gas phase reactor, semi-batch or batch reactor, in the presence of a polymerization catalyst. Preferably, the fractions are produced in a slurry reaction, preferably in a loop reactor, or in a gas phase reaction.

The composition can also be produced by in-situ blending at least two of the three fractions or all three fractions. By in-situ blending, production of a multimodal polymer is meant wherein the fractions are produced either simultaneously in one reaction stage (e.g. by using different catalysts) and/or are produced in a multistage process. A multistage process is defined to be a polymerization process in which a polymer comprising two or more fractions is produced by producing each or at least two polymer fraction(s) in a separate reaction stage, usually with different reaction conditions in each stage, in the presence of the reaction product of the previous stage which comprises a polymerization catalyst. The polymerization reactions used in each stage may involve conventional ethylene homopolymerization or copolymerization reactions, e.g. gas-phase, slurry phase, liquid phase polymerizations, using conventional reactors, e.g. loop reactors, gas phase reactors, stirred tank reactors, batch reactors etc. (see for example WO97/44371 and WO96/18662).

Thus, the multimodal polyethylene moulding composition of the invention can be prepared via a multistage reaction sequence comprising successive polymerization steps carried out under predetermined different reaction conditions in respective reactors arranged in series so as to obtain respective polyethylene fractions having different molecular weights. A process of this type can be performed in a suspension medium: in this case, monomers and a molar weight regulator, preferably hydrogen, are firstly polymerized in a first reactor under first reaction conditions in the presence of a suspension medium and a suitable catalyst, then transferred to a second reactor and further polymerized under second reaction conditions, and further transferred to a third reactor and further polymerized under third reaction conditions, with the first reaction conditions differing from the second and third reaction conditions so as to obtain three polyethylene fractions having different molecular weights.

Thus viewed from another aspect the invention provides a process for the preparation of a polymer moulding composition as hereinbefore defined comprising blending fractions A, B and C in a mixing apparatus.

Catalyst

In each production method a polymerization catalyst is used. The polymerization catalysts include coordination catalysts of a transition metal, such as Ziegler-Natta (ZN), metallocenes, non-metallocenes, Cr-catalysts etc. The catalyst may be supported, e.g. with conventional supports including silica, Al-containing supports and magnesium dichloride based supports.

Preferably the catalyst is a metallocene catalyst. The preparation of the metallocene catalyst can be carried out according to or analogously to the methods known from the literature and is within the skills of an art skilled person. Said metallocenes bear at least one organic ligand, generally 1, 2 or 3, e.g. 1 or 2, which is η-bonded to the metal, e.g. a $\eta^{2-6}$-ligand, such as a $\eta^5$-ligand. Preferably, a metallocene is a Group 4 to 6 transition metal, suitably titanocene, zirconocene or hafnocene, which contains at least one $\eta^5$-ligand, which is e.g. an optionally substituted cyclopentadienyl, an optionally substituted indenyl, an optionally substituted tetrahydroindenyl or an optionally substituted fluorenyl.

The metallocene compound may have a formula I:

$$(Cp)_m T_n MA_q \qquad (I)$$

wherein:
each Cp independently is an unsubstituted or substituted and/or fused homo- or heterocyclopentadienyl ligand, e.g. substituted or unsubstituted cyclopentadienyl, substituted or unsubstituted indenyl or substituted or unsubstituted fluorenyl ligand; the optional one or more substituent(s) being selected preferably from halogen, hydrocarbyl (e.g. $C_1$-$C_{20}$-alkyl, $C_2$-$C_{20}$-alkenyl, $C_2$-$C_{20}$-alkynyl, $C_3$-$C_{12}$-cycloalkyl, $C_6$-$C_{20}$-aryl or $C_7$-$C_{20}$-arylalkyl), $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —SiR"$_3$, —OSiR", —SR", —PR"$_2$ or —NR"$_2$, each R" is independently a hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl; or e.g. in case of —NR"$_2$, the two substituents R" can form a ring, e.g. five- or six-membered ring, together with the nitrogen atom wherein they are attached to.

T is a bridge of 1-7 atoms, e.g. a bridge of 1-4 C-atoms and 0-4 heteroatoms, wherein the heteroatom(s) can be e.g. Si, Ge and/or O atom(s), whereby each of the bridge atoms may bear independently substituents, such as $C_1$-$C_{20}$-alkyl, tri($C_1$-$C_{20}$-alkyl)silyl, tri($C_1$-$C_{20}$-alkyl)siloxy or $C_6$-$C_{20}$-aryl substituents); or a bridge of 1-3, e.g. one or two, hetero atoms, such as silicon, germanium and/or oxygen atom(s), e.g. —SiR$^1$$_2$, wherein each $R^1$ is independently $C_1$-$C_{20}$-alkyl, $C_6$-$C_{20}$-aryl or tri($C_1$-$C_{20}$-alkyl)silyl- residue, such as a trimethylsilyl-residue.

M is a transition metal of Group 4 to 6, such as Group 4, e.g. Ti, Zr or Hf.

Each A is independently a sigma-ligand, such as H, halogen, $C_1$-$C_{20}$-alkyl, $C_1$-$C_{20}$-alkoxy, $C_2$-$C_{20}$-alkenyl, $C_2$-$C_{20}$-alkynyl, $C_3$-$C_{12}$-cycloalkyl, $C_6$-$C_{20}$-aryl, $C_6$-$C_{20}$-aryloxy, $C_7$-$C_{20}$-arylalkyl, $C_7$-$C_{20}$-arylalkenyl, —CH$_2$—Y, wherein Y is $C_{6-20}$-aryl, $C_{6-20}$-heteroaryk $C_{1-20}$-alkoxy, $C_{6-20}$-aryloxy, —NR"$_2$, —SiR"$_3$ or OSiR"$_3$, —SR", —PR"$_3$. —SiR"$_3$, —OSiR"$_3$ or —NR"$_2$; each R" is independently hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl; or e.g. in case of —NR"$_2$, the two substituents R" can form a ring, e.g. five- or six-membered ring, together with the nitrogen atom wherein they are attached to.

Each of the above mentioned ring moieties alone or as a part of a moiety as the substituent for Cp, A, R" or $R^1$ can further be substituted e.g. with $C_1$-$C_{20}$-alkyl which may contain Si and/or O atoms;

n is 0, 1 or 2, e.g. 0 or 1, m is 1, 2 or 3, e.g. 1 or 2, q is 1, 2 or 3, e.g. 2 or 3, wherein m+q is equal to the valency of M.

More preferably a metallocene compound of formula II $$(Cp)_2MX_2 \quad (II)$$

wherein both Cp are an optionally substituted or an optionally fused homo- or heterocyclopentadienyl ligand;

M is Zr or Hf;

and both X are —CH$_2$—Y, wherein Y is $C_{6-20}$-aryl, $C_{6-20}$-heteroaryl, $C_{1-20}$-alkoxy, $C_{6-20}$-aryloxy, —NR"$_2$, —SiR"$_3$ or OSiR"$_3$, R" being a $C_{1-20}$ hydrocarbyl or in case of —NR$_2$, the two substituents R can form a ring together with the nitrogen atom wherein they are attached to.

In the formula (II) both Cp are an optionally substituted or an optionally fused homo- or heterocyclopentadienyl ligand, e.g. a substituted or unsubstituted cyclopentadienyl, a substituted or unsubstituted indenyl or a substituted or unsubstituted fluorenyl ligand.

Said optional substituent(s) present on the Cp group are selected from halogen, hydrocarbyl (e.g. $C_{1-20}$-alkyl, $C_{2-20}$-alkenyl, $C_{2-20}$-alkynyl, $C_{3-12}$-cycloalkyl, $C_{6-60}$-aryl or $C_{7-20}$-arylalkyl), $C_{3-12}$-heterocycloalkyl, $C_{5-20}$-heteroaryl, $C_{1-20}$-haloalkyl, —NR'$_2$, —SiR'$_3$ or OSiR'$_3$, R' being a $C_{1-20}$ hydrocarbyl (e.g. $C_{1-20}$-alkyl, $C_{2-20}$-alkenyl, $C_{2-20}$-alkynyl, $C_{3-12}$-cycloalkyl or $C_{6-20}$-aryl) or in case of —NR'$_2$, the two substituents R' can form a ring together with the nitrogen atom wherein they are attached to.

Cp preferably denotes cyclopentadienyl, indenyl, tetrahydroindenyl or fluorenyl, optionally substituted as defined above. More preferably Cp denotes cyclopentadienyl or tetrahydroindenyl.

In a preferred embodiment both Cp groups remain unsubstituted or are both substituted with the same number and kind of substituent. Preferred substituents include $C_{1-20}$-alkyl, $C_{6-20}$-aryl or $C_{7-20}$-arylalkyl.

Especially preferably the Cp groups are unsubstituted or carry both a $C_{1-6}$-alkyl substituent such as methyl, ethyl, isopropyl or n-butyl.

M is preferably Zr or Hf, especially preferably Hf.

Preferably both Y are selected from $C_{6-20}$-aryl, —NR"$_2$, —SiR"$_3$ or OSiR"$_3$, where R" is defined as above.

More preferably —CH$_2$—Y is benzyl or —CH$_2$—SiR"$_3$, with R" being $C_{1-6}$-alkyl or $C_{6-10}$-aryl.

Particularly preferred are the following compounds:
Bis(n-butylcyclopentadienyl)Hf dibenzyl,
Bis(methylcyclopentadienyl)Hf dibenzyl,
Bis(1,2-dimethylcyclopentadienyl)Hf dibenzyl,
Bis(n-propylcyclopentadienyl)Hf dibenzyl,
Bis(i-propylcyclopentadienyl)Hf dibenzyl,
Bis(1,2,4-trimethylcyclopentadienyl)Zr dibenzyl,
Bis(tetrahydroindenyl)Zr dibenzyl,
Bis(n-butylcyclopentadienyl)Hf (CH$_2$SiMe$_3$)$_2$,
Bis(n-propylcyclopentadienyl)Hf (CH$_2$SiMe$_3$)$_2$,
Bis(i-propylcyclopentadienyl)Hf (CH$_2$SiMe$_3$)$_2$
Bis(1,2,4-trimethylcyclopentadienyl)Zr(CH$_2$SiMe$_3$)$_2$, Most preferred compound is Bis(n-butylcyclopentadienyl) Hf dibenzyl.

The preparation of the metallocenes used according to the invention can be carried out accordingly or analogously to methods known from the literature and is within skills of a person skilled in the field.

The metallocene compounds of formula I can be produced for example as described in EP 1 462 464.

The catalyst composition preferably used in the invention further comprises an alumoxane-impregnated support prepared by contacting an alumoxane or a modified alumoxane with silica as an inert carrier material There are a variety of methods for preparing alumoxane and modified alumoxanes, non-limiting examples of which are described in U.S. Pat. Nos. 4,665,208, 4,952,540, 5,091, 352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451 5,744,656 and European publications EP-A-0 561 476, EP-B1-0 279 586 and EP-A-0 594-218, and WO 94/10180, all of which are herein fully incorporated by reference.

Preferably, alumoxanes, particularly methylalumoxane or modified methylalumoxane, isobutylalumoxane, e.g. TIBAO (tetraisobutylalumoxane) or HIBAO (hexaisobutylalumoxane) are used to impregnate the support. More preferably methylalumoxane (MAO) is used.

The mole ratio of the Al of the alumoxane component to the metal of the single site catalyst is in the range of between 0.3:1 to 2000:1, preferably 20:1 to 800:1, and most preferably 50:1 to 500:1.

Preferably silica is used as inert carrier. The surface area, pore volume and particle size of the silica can be chosen according to the requirements of the specific polymerization process, in which the catalysts will be used. Typically, silica particles having a surface area in the range of from about 10 to about 700 m$^2$/g (BET method), pore volume in the range of from about 0.1 to about 6.0 cm$^3$/g and average particle size in the range of from about 10 to about 500 μm can be used. The silica may be in granular, agglomerated, fumed or other form.

It is further preferred that the carrier material is calcinated, i.e. heat treated under air and then with a non-reactive gas such as nitrogen. This treatment is preferably done at a temperature in excess of 100° C., more preferably 200° C. or higher, e.g. 200-800° C., particularly about 600° C. The calcination treatment is preferably effected for several hours, e.g. 2 to 30 hours, more preferably about 10 hours.

The alumoxane-impregnated support is obtained by contacting an alumoxane with silica and heating to a temperature from 50° C. to 100° C. This alumoxane-containing silica is used as support for the metallocene of the formula (I) or (II).

Preferably the alumoxane-impregnated support contains less than 15.0 wt % of aluminium, more preferably 9.0 to 14.5 wt % and most preferably 10.0 to 14.0 wt % of aluminium, based on the total weight of the support material and alumoxane.

The catalyst is preferably loaded onto the support material at from 0.05 to 4%, preferably 0.1 to 3.0%, especially 0.2 to 2.0%, by weight of active metal relative to the dry weight of the support material.

The polyethylene composition of the invention may also contain minor quantities of additives such as pigments, nucleating agents, antistatic agents, fillers, antioxidants, processing aids, etc., generally in amounts of up to 10% by weight, preferably up to 5% by weight.

Applications

The moulding composition of the invention can be used to form any moulded article, e.g. blow moulded or rotomoulded article. In particular, the present invention further concerns an injection or compression moulded article comprising the polyethylene composition as described hereinbefore. In a further aspect the invention provides a process for preparing the injection or compression moulded article which comprises injection or compression moulding of the composition into an article, and to the use of the polyethylene composition for injection or compression moulding.

Preferred injection moulded articles include containers such as bottles, caps and closures, transport packaging, such as boxes, crates, bins etc, houseware applications such as buckets, food containers and sink bowls and thin wall packaging articles such as open top plastic containers for frozen or fresh food or non food application such as paint, adhesives, cosmetics and pharmaceuticals.

The invention will now be described with reference to the following non limiting figures and examples.

EXPERIMENTAL AND EXAMPLES

1. Definitions and Measurement Methods

GPC: Molecular weight averages, molecular weight distribution, and polydispersity index (Mn, Mw, MWD, PDI)

Molecular weight averages (Mw, Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4:2003 and ASTM D 6474-99. A Waters GPCV2000 instrument, equipped with differential refractive index detector and online viscosimeter was used with 2×GMHXL-HT and 1×G7000HXL-HT TSK-gel columns from Tosoh Bioscience and 1,2,4-trichlorobenzene (TCB, stabilized with 250 mg/L 2,6-Di tert butyl-4-methyl-phenol) as solvent at 140° C. and at a constant flow rate of 1 mL/min. 209.5 μL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants for PS, PE and PP used are as per ATMD 6474-99. All samples were prepared by dissolving 0.5-4.0 mg of polymer in 4 mL (at 140° C.) of stabilized TCB (same as mobile phase) and keeping for max. 3 hours at max. 160° C. with continuous gentle shaking prior sampling into the GPC instrument.

Density

Density of the polymer was determined according to ISO 1183-1987 method D on compression-moulded specimens.

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. and may be determined at different loadings such as 2.16 kg ($MFR_{190/2}$), 5 kg ($MFR_{190/5}$) or 21.6 kg ($MFR_{190/21}$).

Charpy Impact Strength

Charpy impact strength was determined according to ISO 179:2000 on V-notched samples of 80×10×4 mm³ at 23° C. (Charpy impact strength (23° C.)) and −20° C. (Charpy impact strength (−20° C.)). Samples were cut from plaques of 4 mm thickness prepared by compression molding according to ISO 293:2004 using the conditions defined in chapter 3.3 of ISO 1872-2:2007.

Tensile Modulus

As a measure for stiffness, the tensile modulus (E-modulus) of the compositions was measured at 23° C. on compression moulded specimens according to according to ISO 527-2:1993. Compression moulded samples were cut from plaques of 4 mm thickness prepared by compression molding according to ISO 293:2004 using the conditions defined in chapter 3.3 of ISO 1872-2:2007. The modulus was measured at a speed of 1 mm/min.

FNCT Test

ESCR was measured according to the full notch creep test method (FNCT) according to ISO/DIS 16770.3 at 50° C. and 6 MPa stress with a notch depth of 1 mm and specimen dimensions 123 mm×6 mm×20 mm. The solvent used was 10vol % Igepal CO-630 in deionized water. Compression moulded samples were employed. Samples were cut from plaques of 6 mm thickness prepared by compression molding according to ISO 293:2004 using the conditions defined in chapter 3.3 of ISO 1872-2:2007.

Spiral Flow

Spiral Test is carried out using an Engel ES330/65 cc90 injection moulding apparatus with a spiral mould and pressure of 600, 1000 or 1400 bar screw diameter: 35 mm max. piston displacement: 150 cm³ spec. injection pressure: 600, 1000, or 1400 bar tool form: oval form; provided by Axxicon; thickness 2 mm, breadth: 5 mm temperature in pre-chamber and die: 230° C.

temperature in zone 2/zone 3/zone 4/zone 5: 230° C./__230° C./__225° C./__200° C.

injection cycle: injection time including holding: 10 s
cooling time: 15 s
injection pressure: Follows from the predetermined length of the testing material.
dwell pressure=injection pressure
screw speed: 30 rpm
system pressure: 10 bar
metering path: should be chosen so that the screw stops 20 mm before its final position at the end of the dwell pressure.
tool temperature: 40° C.

The spiral flow length can be determined immediately after the injection operation.

Comonomer Content

Comonomer content of the obtained products was measured in a known manner based on Fourier transform infrared spectroscopy (FTIR) calibrated with $^{13}$C-NMR, using Nicolet Magna 550 IR spectrometer together with Nicolet Omnic FTIR software.

Films having a thickness of about 220 to 250 μm were compression moulded from the samples. Similar films were made from calibration samples having a known content of the comonomer. The thicknesses were measured from at least five points of the film. The films were then rubbed with sandpaper to eliminate reflections. The films were not touched by plain hand to avoid contamination. For each sample and calibration sample at least two films were prepared. The films were pressed from pellets by using a Graceby Specac film press at 150° C. using 3+2 minutes preheating time, 1 minute compression time and 4 to 5 minutes cooling time. For very high molecular weight samples the preheating time may be prolonged or the temperature increased.

The comonomer content was determined from the absorbance at the wave number of approximately 1378 cm$^{-1}$. The comonomer used in the calibration samples was the same as the comonomer present in the samples. The analysis was performed by using the resolution of 2 cm$^{-1}$, wave number span of from 4000 to 400 cm$^{-1}$ and the number of sweeps of 128. At least two spectra were run from each film.

The comonomer content was determined from the spectrum from the wave number range of from 1430 to 1100 cm$^{-1}$. The absorbance is measured as the height of the peak by selecting the so-called short or long base line or both. The short base line is drawn in about 1410-1320 cm$^{-1}$ through the minimum points and the long base line about between 1410 and 1220 cm$^{-1}$. Calibrations need to be done specifically for each base line type. Also, the comonomer content of the unknown sample needs to be within the range of the comonomer contents of the calibration samples.

2. Catalyst Preparation

Example 2.1

Metallocene Complex Preparation

The catalyst complex used in the polymerisation examples was bis(n-butyl cyclopentadienyl)hafnium dibenzyl, (n-BuCp)$_2$Hf(CH$_2$Ph)$_2$, and it was prepared according to "Catalyst Preparation Example 2" of WO2005/002744, starting from bis(n-butyl cyclopentadienyl)hafnium dichloride (supplied by Witco).

The catalyst preparation was made in a 160 L batch reactor into which a metallocene complex solution was added. Mixing speed was 40 rpm during reaction and 20 rpm during drying. Reactor was carefully flushed with toluene prior to reaction and inertized with nitrogen after silica addition Example 2.2

Preparation of Catalyst Composition 10.0 kg activated silica (commercial silica carrier, XPO2485A, having an average particle size 20 μm, supplier: Grace) were first slurried into 21.7 kg dry toluene at room temperature. Then the silica slurry was added to 14.8 kg of 30 wt % methylalumoxane in toluene (MAO, supplied by Albemarle) during 3 hours. Afterwards the MAO/silica mixture is heated to 79° C. for 6 hours and then cooled down to room temperature again. The resulting solution was reacted with 0.33 kg of (n-BuCp)$_2$Hf(CH$_2$Ph)$_2$ in toluene (67.9 wt %) for 8 hours at room temperature. The catalyst was dried under nitrogen purge for 5.5 hours at 50° C. The obtained catalyst had an Al/Hf mol-ratio of 200, an Hf-concentration of 0.44 wt % and an Al-concentration of 13.2 wt %.

3. Polyethylene moulding composition

Example 3.1

Preparation of Fractions A, B and C

The low molecular weight ethylene homopolymer fraction A (LMW$_h$-fraction), a medium molecular weight ethylene homopolymer fraction (MMW$_h$-fraction) and a high molecular weight ethylene copolymer fraction (HMW$_c$-fraction) were produced separately in a plant having a prepolymerization reactor (loop type prepolymerizer 50 dm$^3$) and a loop reactor 500 dm$^3$).

The above prepared catalyst was fed into the prepolymerization reactor as 15 wt % oil slurry (primol 352).

Further reaction parameters are disclosed in Table 1.

TABLE 1

| Fraction | LMW$_h$ | MMW$_h$ | HMW$_c$ |
| --- | --- | --- | --- |
| Prepolymerization | | | |
| T [° C.] | 60 | 60 | 60 |
| Pressure [bar] | 60 | 60 | 60 |
| Catalyst feed [g/h] | 35 | 29.7 | 15.2 |
| Antistatic feed [ppm] Octastat 3000 | 5 | 5 | 0 |
| Ethylene-feed [kg/h] | 0 | 2 | 0 |
| H$_2$-feed [g/h] | 0 | 1 | 0 |
| Propane-feed [kg/h] | 47 | 47 | 34 |
| Loop | | | |
| T [° C.] | 85 | 85 | 80 |
| Pressure [bar] | 57 | 57 | 57 |
| Ethylene feed [kg/h] | 37 | 37 | 30 |
| H$_2$-feed [g/h] | 8 | 1.8 | 0 |
| Hexene-feed [kg/h] | 0 | 0 | 5 |
| Propane-feed [kg/h] | 82 | 82 | 82 |
| C$_2$-conc [mol %] | 7.6 | 6.2 | 6.2 |
| H$_2$/C$_2$-ratio [mol/kmol] | 0.48 | 0.07 | 0.06 |
| C$_6$/C$_2$-ratio [mol/kmol] | — | — | 207 |
| Production rate [kg/h] | 32.3 | 34.0 | 29.1 |
| Properties | | | |
| Irganox B225 [ppm] | 2000 | 2000 | 2000 |
| MFR$_{190/2}$ [g/10 min] | 340 | 0.93 | — |
| MFR$_{190/21}$ [g/10 min] | — | 17 | 0.89 |
| Density [kg/m$^3$] | 972.4 | 954.5 | 907.4 |

TABLE 1-continued

| Fraction | $LMW_h$ | $MMW_h$ | $HMW_c$ |
|---|---|---|---|
| $M_w$ [kg/mol] | 24 | 129 | 272 |
| $C_6$-content [wt %] | — | — | 8.6 |

3.2. Preparation of the Polyethylene Moulding Composition

The three fractions $LMW_h$, $MMW_h$ and $HMW_c$ were blended in equal proportions (33.3 wt % each) and melt—homogenized in an extruder.

Compounding was done in an intermeshing co-rotating twin screw extruder Prism TSE 16 having a screw diameter D of 16 mm and an L/D ratio of 25, using high intensity mixing screws equipped with kneading blocks. The temperature profile along the screw length was set to 210° C./215° C./220° C./215° C./210° C., using an output rate of 1-1.5 kg/hr and a screw speed of 200 RPM.

Each composition was extruded twice to ensure proper homogenization.

The properties of the composition can be seen in Table 2.

3.3. Comparative Examples

The properties of the inventive composition from Example 3.2 have been compared to the properties of a commercial moulding grade Borstar® MB6561 (Borealis), a bimodal high density polyethylene designed for injection and compression moulding, produced by the Borstar PE technology (CEX 1).

Furthermore, a trimodal composition from EP 1,772,486, Ex. 3 was used as comparative example 2 (CEX2).

In comparative example 3, we compare our invention to a bimodal HDPE single site grade formed from an ethylene homopolymer component and an ethylene hexene copolymer.

The properties of the compositions can be seen in Table 2.

TABLE 2

| | Inventive Example | CEX1 (MB6561) | CEX2 (EP1772486, Ex. 3) | CEX3 Bimodal SSC (homo/C6) |
|---|---|---|---|---|
| Density [kg/m³] | 951.9 | 956 | 952.9 | 959 |
| $MFR_{190/2}$ [g/10 min] | 0.9 | 1.5 | 0.91 | 0.9 |
| Tensile modulus [MPa] | 990 | 900 | 820 | 1000 |
| Charpy impact (+23° C.), [kJ/m²] | 38 | 9.4 | 28 | 16.4 |
| Charpy impact (−20° C.), [kJ/m²] | 16.8 | 3.5 | 12 | 25 |
| FNCT (50° C., 6 MPa), [h] | 30 | 20 | — | 9 |
| Spiral flow (600/1000/1140 bar) [cm] | 20.7/32.0/43 | 29/42/56 | 25.6/38.8/50.9 | 24/36/48 |

Figure 1:
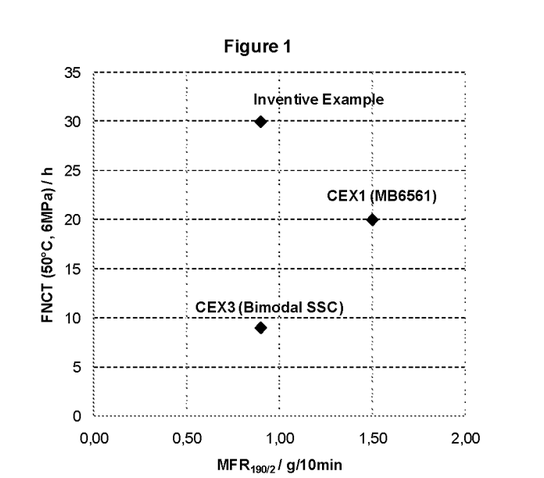
FIG. 1 shows the relationship between FNCT and tensile modulus showing clearly that the combination of the invention gives rise to advantageous properties.
Figure 2:
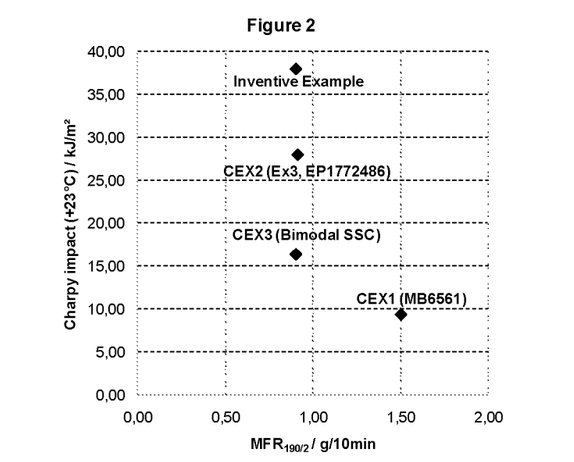
In FIG. 2 we plot the 23° C. charpy measurement against $MFR_2$ value. We can achieve high charpy values at low MFR (and hence high Mw) meaning we are able to combine good impact strength with high stiffness.

The data in Table 2 has been plotted in FIGS. 1-2. FIG. 1 shows the relationship between FNCT and tensile modulus showing clearly that the combination of the invention gives rise to advantageous properties.

In FIG. 2 we plot the 23° C. Charpy impact strength measurement against $MFR_2$ value. We can also achieve high modulus values at low MFR (and hence high Mw), meaning we are able to combine good impact strength with high stiffness.

The invention claimed is:

1. A high density polyethylene moulding composition having a multimodal molecular weight distribution, having a density according to ISO 1183 at 23° C. in the range of 945 to 965 kg/m³ and an $MFR_{190/2}$ according to ISO 1133 in the range of 0.05 to 25 g/10 min, said polyethylene moulding composition comprising at least three ethylene polymer fractions having distinct molecular weights:
   A) 15 to 50 wt % of a low molecular weight ethylene homopolymer fraction with a weight average molecular weight Mw in the range of 15 to 40 kg/mol;
   B) 15 to 50 wt % of a medium molecular weight ethylene homopolymer fraction with a weight average molecular weight Mw in the range of 70 to 180 kg/mol; and
   C) 15 to 50 wt % of a high molecular weight ethylene copolymer fraction with a weight average molecular weight Mw in the range of 200 to 400 kg/mol;
   and wherein the composition has:
   a tensile modulus according to ISO 527-2:1993 measured on compression moulded samples of at least 800 MPa;
   a Charpy impact strength CIS (23° C.) according to ISO 179:2000 measured on V-notched samples produced by compression moulding of at least 30 kJ/m²; and
   an environmental stress crack resistance ESCR measured as FNCT full notch creep test according to ISO/DIS 16770.3 at 50° C. and 6 MPa of at least 20 h.

2. A composition as claimed in claim 1 having a Charpy impact strength (−20° C.) according to ISO 179:2000 measured on V-notched samples produced by compression moulding of at least 10 kJ/m².

3. A composition as claimed in claim 1 in which there is at least 20 wt % of each fraction A), B) and C).

4. A composition as claimed in claim 1 wherein component B has a density of 940 to 965 kg/m³.

5. A composition as claimed in claim 1 wherein component C has a density of less than 915 kg/m³.

6. A composition as claimed in claim 1 wherein fraction C is an ethylene hexene copolymer.

7. A composition as claimed in claim 1 wherein fraction C forms at least 25 wt % of the composition.

8. A composition as claimed in claim 1 having an environmental stress crack resistance ESCR measured as FNCT full notch creep test according to ISO/DIS 16770.3 at 50° C. and 6 MPa of at least 20 h.

9. A composition as claimed in claim 1 wherein the fractions A, B and C are manufactured using a single site catalyst.

10. A moulded article comprising a composition as claimed in claim 1.

11. A high density polyethylene moulding composition having a multimodal molecular weight distribution, having a density according to ISO 1183 at 23° C. in the range of 945 to 965 kg/m³ and an $MFR_{190/2}$ according to ISO 1133 in the range of 0.05 to 25 g/10 min, said polyethylene moulding composition comprising at least three ethylene polymer fractions having distinct molecular weights:
   A) 15 to 50 wt % of a low molecular weight ethylene homopolymer fraction with an $MFR_{190/2}$ of 50 to 1000 g/10 min;
   B) 15 to 50 wt % of a medium molecular weight ethylene homopolymer fraction with an $MFR_{190/21}$ of 6 to 50 g/10 min; and
   C) 15 to 50 wt % of a high molecular weight ethylene copolymer fraction with an $MFR_{190/21}$ of 0.05 to 5 g/10 min;

and wherein the composition has:
a tensile modulus according to ISO 527-2:1993 measured on compression moulded samples of at least 800 MPa;
a Charpy impact strength CIS (23° C.) according to ISO 179:2000 measured on V-notched samples produced by compression moulding of at least 30 kJ/m$^2$; and
an environmental stress crack resistance ESCR measured as FNCT full notch creep test according to ISO/DIS 16770.3 at 50° C. and 6 MPa of at least 20 h.

12. A process for the manufacture of a polyethylene moulding composition, the process comprising blending
A) 15 to 50 wt % of a low molecular weight ethylene homopolymer fraction with a weight average molecular weight Mw in the range of 15 to 40 kg/mol;
B) 15 to 50 wt % of a medium molecular weight ethylene homopolymer fraction with a weight average molecular weight Mw in the range of 70 to 180 kg/mol; and
C) 15 to 50 wt % of a high molecular weight ethylene copolymer fraction with a weight average molecular weight Mw in the range of 200 to 400 kg/mol so as to form a high density polyethylene moulding composition having a multimodal molecular weight distribution,
a density according to ISO 1183 at 23° C. in the range of 945 to 965 kg/m$^3$ and an $_{MFR190/2}$ according to ISO 1133 in the range of 0.05 to 25 g/10 min,
a tensile modulus according to ISO 527-2:1993 measured on compression moulded samples of at least 800 MPa;
a Charpy impact strength CIS (23° C.) according to ISO 179:2000 measured on V-notched samples produced by compression moulding of at least 30 kJ/m$^2$; and
an environmental stress crack resistance ESCR measured as FNCT full notch creep test according to ISO/DIS 16770.3 at 50° C. and 6 MPa of at least 20 h.

* * * * *